Patented Sept. 12, 1933

1,926,638

UNITED STATES PATENT OFFICE 1,926,638

PROCESS FOR MAKING VINYL CHLORIDE

Walter J. Toussaint, South Charleston, W. Va., assignor to Carbide & Carbon Chem. Corp., a corporation of New York No Drawing. Application February 15, 1932
Serial No. 593,197

4 Claims. (Cl. 260—166)

The invention relates to a process for making vinyl chloride, referring more specifically to a process wherein acetylene and hydrogen chloride combine to form vinyl chloride in the presence of mercuric chloride as a catalyst.

Acetylene and hydrogen chloride tend to combine under suitable conditions to form vinyl chloride according to the overall reaction $$CH \equiv CH + HCl \rightarrow CH_2 = CHCl$$

and this reaction is catalyzed by mercuric chloride. Various media have been suggested within which this catalyst may be suspended and the reaction effected: for example acetic acid, acetone, water, and aqueous solutions of hydrogen chloride. Vinyl chloride is produced at a moderate rate by the above reaction in these media.

I have discovered that the activity of mercuric chloride as a catalyst of the reaction of acetylene with hydrogen chloride to form vinyl chloride is greatly enhanced when substantially anhydrous stannic chloride forms the reaction medium. My invention therefore provides a new and improved process for making vinyl chloride which comprises combining acetylene and hydrogen chloride in the presence of a substantially anhydrous mixture of mercuric chloride and stannic chloride, and recovering the vinyl chloride formed thereby.

I prefer to perform the process by passing a substantially dry mixture of acetylene and hydrogen chloride through a solution or suspension of mercuric chloride in anhydrous stannic chloride. The gas mixture should preferably pass through the reaction medium in the form of very small bubbles to improve the contact between the reactants and the medium.

I have found that a concentration of mercuric chloride of about 0.75% to 1% by weight of the reaction medium produces good results in my process, but higher concentrations may be used, and somewhat lower concentrations are effective although not desirable.

The following example illustrates an application of my invention: eighty grams of anhydrous stannic chloride was used as the reaction medium, and to this was added 0.6 gram of mercuric chloride. A substantially anhydrous mixture consisting of acetylene and hydrogen chloride, in the proportions of approximately 0.8 mol of acetylene to 0.2 mol of hydrogen chloride, was passed into the reaction medium through a porous ceramic diffuser. The effluent gases were cooled to recover stannic chloride therefrom and the stannic chloride was returned to the reaction mixture. After the removal of stannic chloride, the remaining gases were passed through water, dried and the vinyl chloride condensed by cooling the gases to −80° C. The temperature of the reaction medium was 55° C., and the duration of the test was 24 hours; 11.3 grams of vinyl chloride was obtained.

A series of experiments, wherein the effectiveness of the medium of the invention was compared to that of an aqueous hydrogen chloride medium, demonstrated the advantages of my new process. In all experiments a mixture in the proportions of about 0.2 mol of hydrogen chloride and 0.8 mol of acetylene was passed through the reaction medium and the vinyl chloride so produced was recovered as in the example given previously. The rate of gas flow in all experiments was the same. Table A gives data obtained in experiments wherein the reaction medium was anhydrous stannic chloride.

Table A

| | | | |
|---|---|---|---|
| Weight of HgCl$_2$, grams | 0.6 | 0.6 | 0.6 |
| Weight of SnCl$_4$, grams | 80 | 65 | 80 |
| Total volume of medium, milliliters | 40 | 30 | 40 |
| Temperature, °C | 55 | 55 | 55 |
| Duration of test, hours | 24 | 24 | 25 |
| Yield of vinyl chloride, grams | 11.3 | 14.7 | 9.6 |
| Vinyl chloride (g/hr/g HgCl$_2$) | 0.8 | 1.0 | 0.6 |

Table B shows data obtained in experiments wherein the reaction medium was aqueous hydrogen chloride.

Table B

| | | |
|---|---|---|
| Weight of HgCl$_2$, grams | 0.6 | 6.0 |
| Weight of HCl, grams | 240 | 61 |
| Total volume of solution, milliliters | 600 | 210 |
| Temperature, °C | 80 | 85 |
| Duration of test, hours | 48 | 104.5 |
| Yield of vinyl chloride, grams | 4.5 | 67.5 |
| Vinyl chloride (g/hr/g HgCl$_2$) | 0.16 | 0.11 |

Comparison of the yields of vinyl chloride expressed as grams of vinyl chloride per hour per gram of mercuric chloride catalyst used, indicate the advantages of my process. It is to be noted that the tests of my process involved a smaller volume of reaction medium, a lower reaction temperature, and a shorter reaction time than required by the process using aqueous HCl as the reacting medium.

Although specific descriptions of process conditions have been disclosed herein by way of example, I do not wish to be limited thereby. I should be limited only to the broad principle of my invention.

I claim:

1. Process for making vinyl chloride which comprises combining acetylene with hydrogen chloride in the presence of a substantially anhydrous mixture of mercuric chloride and stannic chloride, and recovering the vinyl chloride formed thereby.

2. Process for making vinyl chloride which comprises passing a mixture of acetylene with hydrogen chloride through substantially anhydrous stannic chloride containing mercuric chloride, and recovering the vinyl chloride formed thereby.

3. In the process for making vinyl chloride by the combination of acetylene with hydrogen chloride in the presence of mercuric chloride the step which comprises bringing the said acetylene, hydrogen chloride and mercuric chloride into mutual contact and into contact with substantially anhydrous stannic chloride.

4. Process for making vinyl chloride which comprises combining acetylene and hydrogen chloride in the presence of mercuric chloride and substantially anhydrous stannic chloride.

WALTER J. TOUSSAINT.